(12) United States Patent
Zhang

(10) Patent No.: US 10,908,918 B2
(45) Date of Patent: Feb. 2, 2021

(54) IMAGE ERASING METHOD AND SYSTEM

(71) Applicant: GUANGZHOU SHIRUI ELECTRONICS CO., LTD., Guangzhou (CN)

(72) Inventor: Weiyuan Zhang, Guangzhou (CN)

(73) Assignee: GUANGZHOU SHIRUI ELECTRONICS CO., LTD., Guangzhou (CN)

( * ) Notice: Subject to any disclaimer, the term of this patent is extended or adjusted under 35 U.S.C. 154(b) by 130 days.

(21) Appl. No.: 16/302,117

(22) PCT Filed: Dec. 29, 2016

(86) PCT No.: PCT/CN2016/113216
§ 371 (c)(1),
(2) Date: Nov. 16, 2018

(87) PCT Pub. No.: WO2017/197893
PCT Pub. Date: Nov. 23, 2017

(65) Prior Publication Data
US 2019/0155611 A1 May 23, 2019

(30) Foreign Application Priority Data
May 18, 2016 (CN) .......................... 2016 1 0334751

(51) Int. Cl.
*G06F 9/44* (2018.01)
*G06F 3/0488* (2013.01)
(Continued)

(52) U.S. Cl.
CPC .............. *G06F 9/44* (2013.01); *G06F 3/0484* (2013.01); *G06F 3/0488* (2013.01); *G06F 9/451* (2018.02)

(58) Field of Classification Search
CPC .......... G06F 9/451; G06F 9/44; G06F 3/0484; G06F 3/0488; G06F 3/04883
(Continued)

(56) References Cited

U.S. PATENT DOCUMENTS

| 4,911,536 A * | 3/1990 | Ditzik ................... | G06F 3/0488 |
| | | | 345/173 |
| 5,574,843 A * | 11/1996 | Gerlach, Jr. ............. | G09B 7/04 |
| | | | 345/418 |

(Continued)

FOREIGN PATENT DOCUMENTS

| CN | 104035764 A | 9/2014 |
| CN | 104657062 A | 5/2015 |

(Continued)

OTHER PUBLICATIONS

International Search Report and Written Opinion, PCT/CN2016/113216, dated Apr. 12, 2017; 11 pages.
(Continued)

*Primary Examiner* — Paul R. Myers
(74) *Attorney, Agent, or Firm* — Zhong Law, LLC

(57) ABSTRACT

An image erasing method and system include acquiring an erasing operation parameter value corresponding to an erasing operation behavior on an image editing interface, determining whether the erasing operation parameter value exceeds a preset parameter threshold, and if so, displaying a screen clearing button on the image editing interface, wherein an image on the image editing interface is cleared when a trigger command of the screen clearing button is received.

18 Claims, 4 Drawing Sheets

(51) Int. Cl.
*G06F 9/451* (2018.01)
*G06F 3/0484* (2013.01)

(58) Field of Classification Search
USPC .......................................................... 713/2
See application file for complete search history.

(56) References Cited

U.S. PATENT DOCUMENTS

| | | | |
|---|---|---|---|
| 5,583,542 A | 12/1996 | Capps et al. | |
| 5,677,710 A * | 10/1997 | Thompson-Rohrlich | G06F 3/04883 345/173 |
| 5,724,985 A * | 3/1998 | Snell | A61N 1/08 600/510 |
| 5,805,725 A * | 9/1998 | Sakata | G06F 3/0488 345/619 |
| 5,867,159 A * | 2/1999 | Hamada | G06F 40/177 345/443 |
| 6,975,334 B1 * | 12/2005 | Barrus | G06T 15/04 345/582 |
| 7,508,444 B1 | 3/2009 | Napoli et al. | |
| 9,285,903 B1 * | 3/2016 | Yun | G06F 3/04883 |
| 9,329,772 B1 * | 5/2016 | Becker | G06F 3/04845 |
| 9,804,732 B2 * | 10/2017 | Kang | G06F 3/0412 |
| 9,851,802 B2 * | 12/2017 | Kong | G06F 3/017 |
| 10,649,580 B1 | 5/2020 | Smith | G06F 3/04883 |
| 2005/0114374 A1 * | 5/2005 | Juszkiewicz | G11B 19/027 |
| 2005/0201612 A1 * | 9/2005 | Park | G06K 9/00778 382/154 |
| 2008/0084504 A1 * | 4/2008 | Nakamura | H04N 5/275 348/590 |
| 2008/0115064 A1 * | 5/2008 | Roach | G06F 3/04897 715/730 |
| 2009/0287531 A1 * | 11/2009 | Yang | G06F 3/0488 705/7.13 |
| 2009/0303199 A1 * | 12/2009 | Cho | G06F 3/04845 345/173 |
| 2010/0188353 A1 * | 7/2010 | Yoon | G06F 3/04883 345/173 |
| 2010/0216635 A1 * | 8/2010 | Kazmaier | G03C 1/73 503/201 |
| 2011/0080427 A1 * | 4/2011 | Oda | G06F 3/04845 345/634 |
| 2011/0298807 A1 * | 12/2011 | Kim | G06T 11/203 345/442 |
| 2012/0084717 A1 * | 4/2012 | Yao | G06F 3/0481 715/792 |
| 2012/0293425 A1 * | 11/2012 | Lee | G06F 3/0488 345/173 |
| 2013/0064458 A1 * | 3/2013 | Silverman | G06K 9/50 382/199 |
| 2013/0132903 A1 * | 5/2013 | Krishnaswamy | G06F 3/04883 715/825 |
| 2013/0198653 A1 * | 8/2013 | Tse | G06Q 10/101 715/751 |
| 2013/0236093 A1 * | 9/2013 | Gatt | G06F 3/04845 382/167 |
| 2013/0311916 A1 * | 11/2013 | Weng | G06F 3/0425 715/764 |
| 2014/0258901 A1 * | 9/2014 | Cho | G06F 3/0416 715/765 |
| 2015/0193141 A1 * | 7/2015 | Goldsmith | G06K 9/222 345/173 |
| 2015/0310652 A1 * | 10/2015 | Dobson | G06F 3/04845 345/629 |
| 2016/0098186 A1 * | 4/2016 | Sugiura | G06F 3/0484 345/173 |
| 2017/0255378 A1 * | 9/2017 | Desai | G06F 3/04845 |

FOREIGN PATENT DOCUMENTS

| | | |
|---|---|---|
| CN | 105094538 A | 11/2015 |
| CN | 105183349 A | 12/2015 |
| CN | 105183473 A | 12/2015 |
| CN | 105955756 A | 9/2016 |
| JP | 2015191673 A | 11/2015 |

OTHER PUBLICATIONS

The State Intellectual Property Office of People's Republic of China, First Office Action, Application No. 201610334751.6; 8 pages.

Extended European Search Report received in European Application No. 16902272.0, dated May 28, 2019; 7 pages.

* cited by examiner

IMAGE ERASING METHOD AND SYSTEM

CROSS-REFERENCE TO RELATED APPLICATIONS

This application claims priority to International Patent Application No. PCT/CN2016/113216 filed Dec. 29, 2016, which claims priority to Chinese application No. CN 201610334751.6, filed May 18, 2016, the contents of which are hereby incorporated by reference as though fully set forth herein.

TECHNICAL FIELD

The present invention relates to the field of image editing technology and, more particularly, to an image erasing method and system.

BACKGROUND

In the process of image editing, it is often necessary to use erase function. When a user intends to erase a large area of content, in most cases, the user usually uses an erasing tool to erase bit by bit. Although this kind of operation behavior conforms with the continuity and habit of the editing activities currently performed by a user, if the final result brought by the operation of a user using the erasing tool to erase bit by bit is the same as the result of using "one-click screen clearing", then the operation of using the erasing tool to erase bit by bit has lower efficiency than the operation of the "one-click screen clearing."

Although there is a full-screen clearing button on image editing function buttons, to avoid excessive erasure of necessary image content during image editing, users seldom use the "one-click screen clearing" operation. Moreover, when users need to use the full-screen clearing, in order to enable the full-screen clearing, they need to find the full-screen clearing button from numerous function buttons, which undoubtedly increases the users' inconvenience of performing full-screen clearing operation.

SUMMARY

In view of the above, it is desirable to provide an image erasing method and system to solve the existing problem of low efficiency of using the erasing tool to erase bit by bit and the inconvenience of using the full-screen clearing button during the image erasing operation.

An image erasing method includes the steps of:

acquiring an erasing operation parameter value corresponding to an erasing operation behavior on an image editing interface;

determining whether the erasing operation parameter value exceeds a preset parameter threshold;

if so, displaying a screen clearing button on the image editing interface; and responsive to receiving a trigger command of the screen clearing button, clearing an image displayed on the image editing interface.

An image erasing system includes:

an acquiring unit to acquire an erasing operation parameter value corresponding to an erasing operation behavior on an image editing interface;

a determining unit to determine whether the erasing operation parameter value exceeds a preset parameter threshold;

a displaying unit to display a screen clearing button on the image editing interface when the determining unit determines that the erasing operation parameter value exceeds the preset parameter threshold; and responsive to receiving a trigger command of the screen clearing button, to clear an image displayed on the image editing interface.

According to the image erasing method and system of the above mentioned present invention, the erasing operation parameter value corresponding to the erasing operation behavior performed by the users on the image editing interface is acquired, and it is determined whether the erasing operation parameter value exceeds the preset parameter threshold. When the erasing operation parameter value exceeds the preset parameter threshold, the screen clearing button is displayed on the image editing interface. When the trigger command of the screen clearing button from the user is received, the screen clearing operation can be performed to clear the image displayed on the image editing interface. This scheme determines whether the erasing operation parameter value exceeds the preset parameter threshold by acquiring and analyzing the users' erasing operation behavior data, and thereby identifies the users' screen clearing intention. When the erasing operation parameter value exceeds a preset parameter threshold, it is indicated that the users have the intention of screen clearing, the screen clearing button is provided to the users on the image editing interface, so that the user can decide whether to clear the screen at this time conveniently, thereby improving the efficiency of erasing the image, and the screen clearing button is directly displayed on the image editing interface when the user performs the erasing operation, and the users can directly trigger the screen clearing button to execute the "one-click screen clearing," eliminating the need to find the screen clearing button among the numerous function buttons.

DESCRIPTION OF EMBODIMENTS

The present invention will be further described in detail below with reference to the accompanying drawings and embodiments, in order to make the objects, technical solutions and advantages of the present invention clearer. It is understood that the specific embodiments described herein are merely illustrative of the invention and are not intended to limit the scope of the invention.

Figure 1:
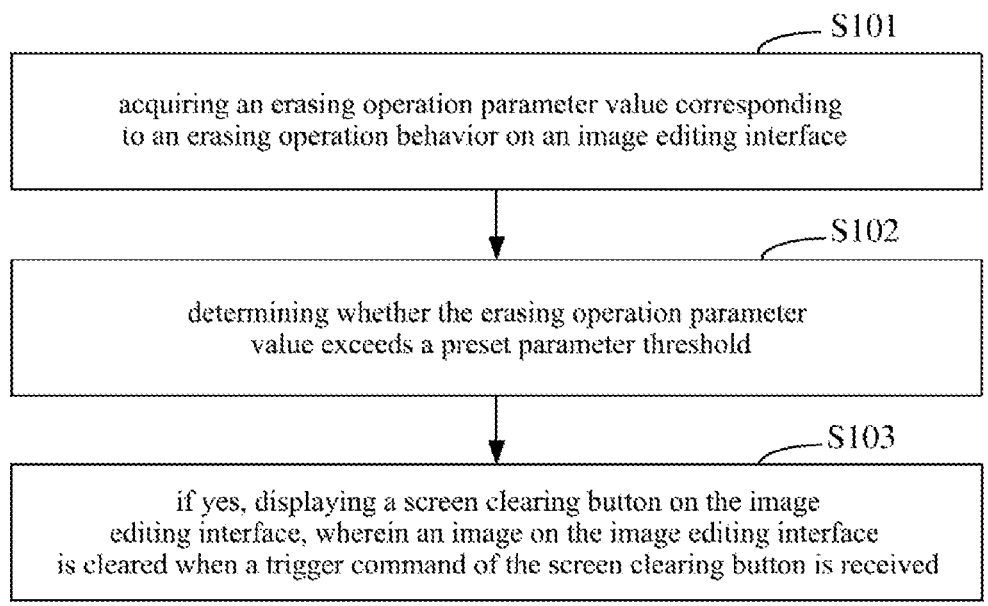
FIG. 1 is a schematic flow chart of an image erasing method according to one embodiment.

Referring to FIG. 1, an embodiment of an image erasing method of the present invention is shown. The image erasing method in this embodiment includes the following steps of:

Step S101: acquiring an erasing operation parameter value corresponding to an erasing operation behavior on an image editing interface;

Step S102: determining whether the erasing operation parameter value exceeds a preset parameter threshold;

Step S103: if so, displaying a screen clearing button on the image editing interface; and responsive to receiving a trigger command of the screen clearing button, clearing an image displayed on the image editing interface.

In this embodiment, the erasing operation parameter value corresponding to the erasing operation behavior performed by the users on the image editing interface is acquired, and whether the erasing operation parameter value exceeds a preset parameter threshold is determined. When the erasing operation parameter value exceeds a preset parameter threshold, the screen clearing button is displayed on the image editing interface. When the trigger command of the screen clearing button from the user is received, a clear operation can be performed to clear the image displayed on the image editing interface. This scheme acquires and analyzes the users' erasing operation behavior data, determines whether the erasing operation parameter value exceeds a preset parameter threshold, and thereby identifying the users' button clearing intention. When the erasing operation parameter value exceeds a preset parameter threshold, it is indicated that the users have the intention to clear the screen. The screen clearing button is provided to the user on the image editing interface, so that the user can decide whether to clear the screen at this time conveniently, thereby improving the efficiency of erasing the image. Since the screen clearing button is directly displayed on the image editing interface when the user performs the erasing operation, the user can directly trigger the screen clearing button to execute the "one-click screen clearing," eliminating the need to find the screen clearing button among the numerous function buttons.

Preferably, when the erasing operation parameter value corresponding to the erasing operation behavior on the image editing interface is acquired, the erasing operation behavior data on the image editing interface may be collected firstly, and the corresponding erasing operation parameter value is extracted in the collected data.

In one of the embodiments, the erasing operation parameter value includes a time duration value associated with an erasing operation behavior;

the step of the determining whether the erasing operation parameter value exceeds a preset parameter threshold comprises the following step:

determining whether the time duration value associated with the erasing operation behavior exceeds a preset duration threshold.

In this embodiment, mainly based on the time duration value associated with the erasing operation behavior in the erasing operation parameter value, when the time duration value exceeds the preset duration threshold value, it can be determined that the user has intention to perform the screen clearing operation when they perform the erasing operation. The time duration value associated with the erasing operation behavior herein may be the time used by the user to perform a single time erasing operation on the image editing interface, or may be the total time used by the user to perform the continuous and multiple times erase operation on the current image editing interface.

In one of the embodiments, the erasing operation parameter value includes a ratio of an erased area to a total area of the image or a ratio of a number of erased objects to a total number of objects of the image;

the step of the determining whether the erasing operation parameter value exceeds a preset parameter threshold includes the following step:

determining whether the ratio of the erased area to the total area of the image exceeds a preset first ratio threshold;

or determining whether the ratio of the number of erased objects to the total number of objects on the image exceeds a preset second ratio threshold.

In this embodiment, mainly based on the ratio of the erased area to the total area of the image or the ratio of the number of erased objects to the total number of objects on the image in the erasing operation parameter value, when the ratio of the erased area to the total area of the image exceeds a preset first ratio threshold or the ratio of the number of erased objects to the total number of objects on the image exceeds a preset second ratio threshold, it can be determined that the user has the intention to perform the screen clearing operation while performing the erasing operation. The first ratio threshold and the second ratio threshold may be same or may be different, and the object may be any one type of elements or regions in the image.

Preferably, the data of the erased area or the number of erased objects may be recorded in the erasing operation behavior data, and the ratio of the erased area to the total area of the image or the ratio of the number of erased objects to the total number of objects of the image can be acquired by calculating based on the erasing operation behavior data, the total area of the image and calculating based on the erasing operation behavior data and the total number of the images.

In one embodiment, the erasing operation parameter value includes a speed value of an erasing operation behavior;

the step of the determining whether the erasing operation parameter value exceeds a preset parameter threshold comprises the following step:

determining whether the speed value of the erasing operation behavior exceeds a preset speed threshold.

In this embodiment, it is mainly based on the speed value of the erasing operation behavior in the erasing operation parameter value. When the speed value of the erasing operation behavior exceeds a preset speed threshold, it is determined that the user has the intention to perform the screen clearing operation while performing the erasing operation.

Preferably, the speed value of the erasing operation behavior is acquired by calculating an erasing path of the erasing operation and the time taken to generate the erasing path.

In one embodiment, the erasing operation parameter value includes a ratio of an erased area to a total area of the image, a time duration value associated with the erasing operation behavior, and a speed value of the erasing operation behavior;

the step of the determining whether the erasing operation parameter value exceeds a preset parameter threshold includes the following step:

determining whether all or any two of the ratio of the erased area to the total area of the image, the time duration value associated with erasing operation behavior, and the speed value of the erasing operation behavior exceed their corresponding preset thresholds;

or the erasing operation parameter value includes a ratio of a number of erased objects to a total number of objects on the image, a time duration value associated with an erasing operation behavior, and a speed value of the erasing operation behavior;

determining whether all or any two of the ratio of the number of erased objects to the total number of objects on the image, the time duration value associated with the erasing operation behavior, and the speed value of the erasing operation behavior exceed their corresponding preset thresholds.

In this embodiment, it is mainly based on the ratio of the erased area to the total area of the image, the ratio of the numbers of erased object to the total numbers of object of the image, the time duration value associated with the erasing operation behavior, and the speed value of the erasing operation behavior in the erasing operation parameter value;

when all three of the ratio of the erased area to the total area of the image, the time duration value associated with the erasing operation behavior, and the speed value of the erasing operation behavior exceed their corresponding preset thresholds or any two of the ratio of the erased area to the total area of the image, the time duration value associated with the erasing operation behavior, and the speed value of the erasing operation behavior exceed their corresponding preset thresholds, it is determined that the user has the intention to perform the screen clearing operation while performing the erasing operation;

or when all three of the ratio of the number of erased objects to the total number of objects on the image, the time duration value associated with the erasing operation behavior, and the speed value of the erasing operation behavior exceed their corresponding preset thresholds or any two of the ratio of the number of erased objects to the total number of objects of the image, the time duration value associated with the erasing operation behavior, and the speed value of the erasing operation behavior exceed their corresponding preset thresholds, it is also determined that the user has the intention to perform the screen clearing operation while performing the erasing operation. Determining based on a variety of values can make a more accurate determination of the intention that the users want to perform the screen clearing operation.

In one of the embodiments, the step of displaying the screen clearing button on the image editing interface includes the following step:

locating the current coordinate position of the erasing operation behavior on the image editing interface and displaying the screen clearing button at the coordinate.

In this embodiment, after determining that the screen clearing button needs to be displayed, the coordinate position of the users' erasing operation behavior on the image editing interface at the current moment is first located. After the locating, the screen clearing button can be displayed at the coordinate position, so that the screen clearing button can be displayed at the position where the user performs the erasing operation during the user performs the erasing operation. The user is directly and clearly prompted to perform the full-screen clearing operation.

In one embodiment, after the step of displaying the screen clearing button on the image editing interface, the following step is included:

terminating display of the screen clearing button if the trigger command of the screen clearing button is not received within the preset time period.

In this embodiment, after the screen clearing button is displayed, the trigger command is not received within the preset time period (namely, the screen clearing button is not used), the displaying of the screen clearing button is terminated, and the screen clearing button disappears. This can give time to the user to consider whether to perform the screen clearing operation. If the screen clearing operation is not performed, the screen clearing button disappears after the preset time period, and is no longer displayed, so as not to affect the users' editing operation to the image.

In one embodiment, after the step of displaying the screen clearing button on the image editing interface, a following step is included:

terminating display of the screen clearing button if receiving, before the trigger command of the screen clearing button is received, an operation command at positions other than the position where the screen clearing button is located in the image editing interface.

In this embodiment, after the screen clearing button is displayed and before the screen clearing button receives the trigger command, the user operates on positions other than the position where the screen clearing button is located in the image editing interface (namely, after the screen clearing button is displayed), the screen clearing button is not triggered, but other operations are performed. At this time, the screen clearing button disappears and is no longer displayed. In this way, the displaying of the screen clearing button can be terminated when the user needs to perform other operations, so as not to affect other operations of the user.

The image erasing method described above can be applied to smart devices such as electronic whiteboard.

Figure 2:
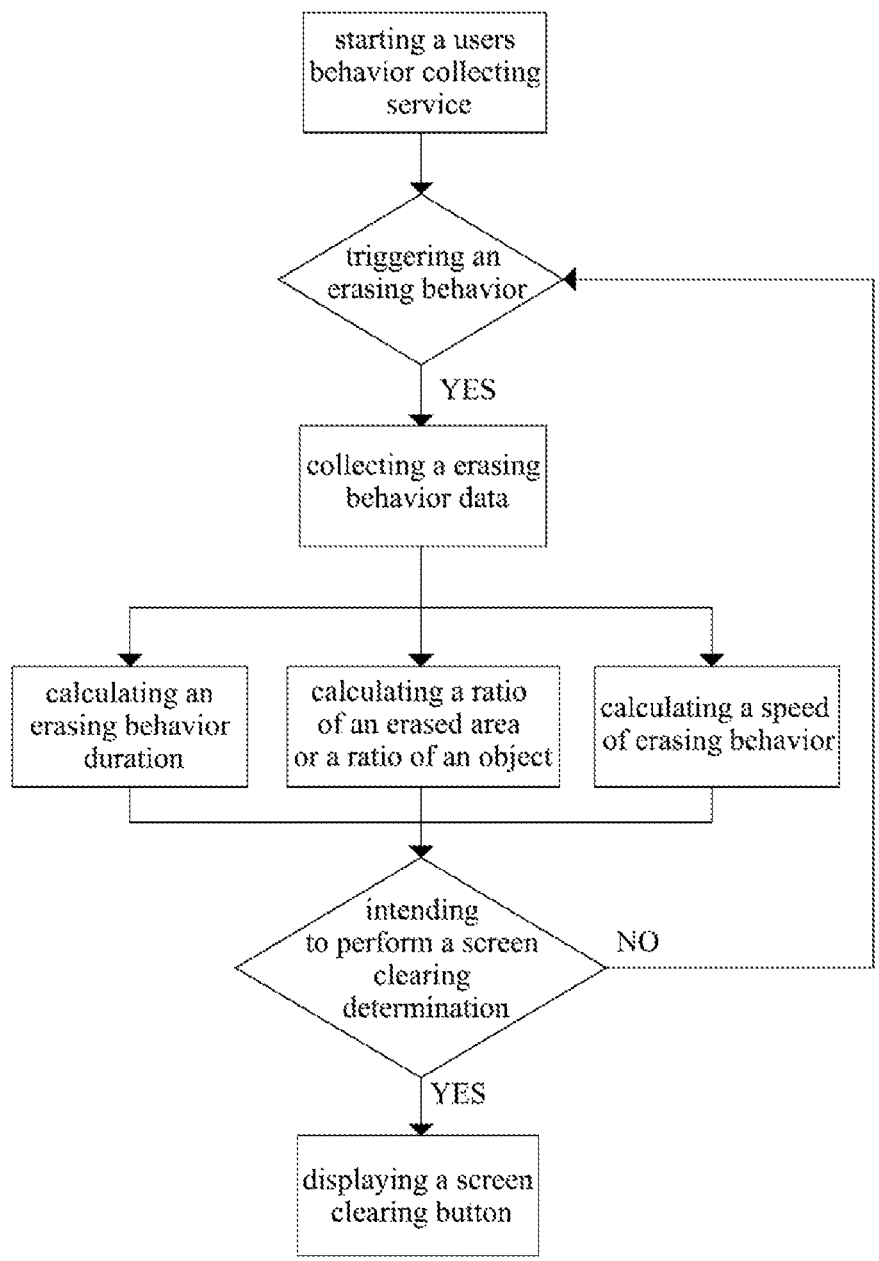
FIG. 2 is a schematic flow chart of an image erasing method according to one embodiment.

Taking the electronic whiteboard as an example, as shown in FIG. 2, the image erasing method of the electronic whiteboard mainly includes: acquiring an erasing operation parameter value, determining intention to perform a screen clearing determination, and displaying a screen button.

Acquiring the erasing operation parameter values includes "collecting erasing behavior data", "calculating a time duration associated with an erasing behavior", "calculating a ratio of an erased area or a ratio of erased objects", and "calculating a speed of erasing behavior";

"collecting erasing behavior data" refers to, when the electronic whiteboard is started, starting a daemon process in background to monitor whether the users trigger an erasing operation, and collecting the erasing behavior and the erasing data;

"calculating erasing behavior duration" refers to, when the user performs the erasing action, starting to calculate the time duration value of the user continuously performing the erasing behavior;

"calculating a ratio of an erased area or a ratio of an object" refers to, when the users perform the erasing action, starting to calculate the ratio of the erased area to the total area or the ratio of the number of erased objects to the total number of objects;

"calculating a speed of erasing behavior" refers to, when the users perform the erasing action, starting to calculate the speed that the user performs the erasing behavior;

"determining intention to perform a screen clearing" refers to comparing the erasing behavior duration, a ratio of the erased area or a ratio of the object, and the speed of the erasing behavior respectively with their corresponding thresholds, and comprehensively analyzing the results of the comparison. It is determined whether to display a screen clearing button according to a three-dimensional comparison result among an erased duration, an erased speed, a ratio of erased area or a ratio of erased objects, or a combination thereof;

"displaying a screen clearing button" refers to, when it is determined that the user intends to clear the screen, providing the command for displaying the screen clearing button, and displaying a screen clearing button at the coordinate position where the erasing behavior at the current moment occurs. The screen clearing button is capable of, responding to a click action by the user, performing the screen clearing operation. The screen clearing button is controlled to disappear after displaying a time period or becoming a non-focal point;

When the displaying command for displaying screen clearing button is received, the coordinate of the erasing behavior at this moment is found, and a screen clearing button is popped up at the coordinate;

Responsive to displaying the screen clearing button, the user may perform a single click to trigger the screen clearing operation;

Responsive to displaying the screen clearing button, the user does not perform the single click, the screen clearing button may automatically disappear after a certain time;

When the screen clearing button is displayed, the user does not perform the single click operation, which allows the screen clearing button to become a non-focal point, the screen clearing button may disappear. In this process, when the screen clearing button is just displayed, the focus is on the screen clearing button. When other locations other than the position where the screen clearing button is located receive an operation command on the displaying interface of the electronic whiteboard, the focus is transferred from the position where the screen clearing button is located to the other locations, and at this time, the screen clearing button becomes a non-focal point.

Figure 3:
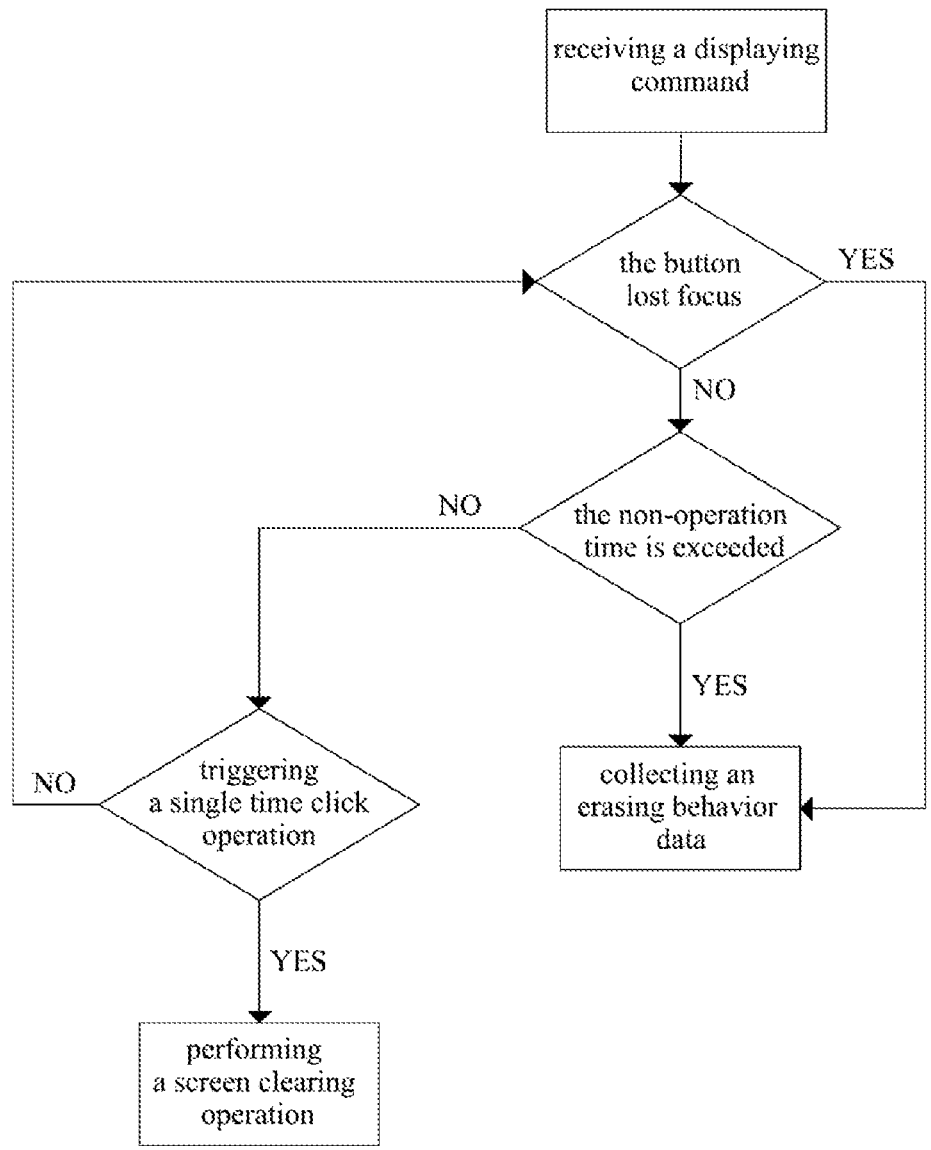
FIG. 3 is a schematic flow chart of a screen clearing button shown in an image erasing method according to one embodiment.

As shown in FIG. 3, the specific process of displaying the screen clearing button is as follows:

receiving a displaying command, displaying the screen clearing button, determining whether the screen clearing button has lost focus, and if so, removing the display of the screen clearing button; if not, determining whether the non-operation time is exceeded;

If so, removing the display of the screen clearing button; if not, waiting for the trigger;

if a single click operation is triggered, performing the screen clearing operation; if the single click is not triggered, returning to the step of determining whether the screen clearing button becomes a non-focal point.

In practical applications, when the user triggers an erasing behavior on the electronic whiteboard, the present invention monitors and collects the erasing behavior of the user, such as when the user erases 30% of the content area and the erasing duration lasts 5 seconds, at this time, a screen clearing button will appear at the current position where the users erase so as to prompt the user that one-click screen clearing can be selected.

The existing scheme does not have the ability of automatically identifying screen clearing intention of the user under the erasing behavior, and the present scheme automatically identifies the users' screen clearing intention through the collection or analysis of the users' behavior data and through thresholds or the threshold combinations in three dimensions. When the users' intention is learned, the device can provide a more convenient path or better experience to the user, which provides the device with intelligent intention.

According to the above image erasing method, the present invention also provides an image erasing system, which will be described in detail below with respect to an embodiment of the image erasing system of the present invention.

Figure 4:
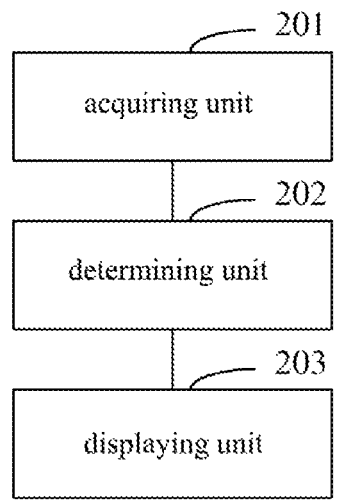
FIG. 4 is a schematic structural diagram of an image erasing system according to one embodiment.

Referring to FIG. 4, an embodiment of an image erasing system of the present invention is shown. The image erasing system in this embodiment includes an acquiring unit 201, a determining unit 202, and a displaying unit 203;

the acquiring unit 201 is to acquire an erasing operation parameter value corresponding to an erasing operation behavior on an image editing interface;

the determining unit 202 is to determine whether the erasing operation parameter value exceeds a preset parameter threshold;

the displaying unit 203 is to display a screen clearing button on the image editing interface when the determining unit 202 determines that the erasing operation parameter value exceeds the preset parameter threshold, wherein an image on the image editing interface is cleared when a trigger command of the screen clearing button is received.

In one of the embodiments, the erasing operation parameter value includes a time duration value associated with an erasing operation behavior;

the determining unit 202 determines whether the time duration value associated with the erasing operation behavior exceeds a preset duration threshold.

In one embodiment, the erasing operation parameter value includes a ratio of an erased area to a total area of the image or a ratio of an number of erased objects to a total number of objects on the image;

the determining unit 202 determines whether the ratio of the erased area to the total area of the image exceeds a preset first ratio threshold;

or the determining unit 202 determines whether the ratio of the number of erased objects to the total number of objects on the image exceeds a preset second ratio threshold.

In one embodiment, the erasing operation parameter value includes a speed value of an erasing operation behavior;

the judging unit 202 determines whether the speed value of the erasing operation behavior exceeds a preset speed threshold.

In one embodiment, the erasing operation parameter value includes a ratio of an erased area to a total area of the image, an erasing operation behavior duration value, and a speed value of the erasing operation behavior;

the determining unit 202 determines whether all or any two of the ratio of the erased area to the total area of the image, the time duration value associated with the erasing operation behavior and the speed value of the erasing operation behavior exceed their corresponding preset thresholds;

or the erasing operation parameter value includes a ratio of a number of erased objects to a total number of objects on the image, a time duration value associated with an erasing operation behavior, and a speed value of the erasing operation behavior;

the determining unit 202 determines whether all or any two of the ratio of the number of erased objects to the total number of objects of the image, the time duration value associated with the erasing operation behavior, and the speed value of the erasing operation behavior exceed their corresponding preset thresholds.

Figure 5:
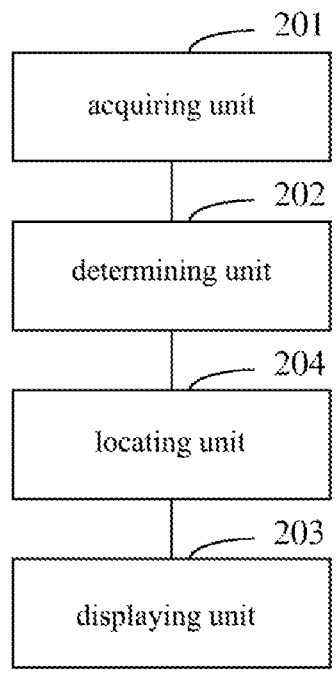
FIG. 5 is a schematic structural diagram of an image erasing system according to one embodiment.

In one embodiment, as shown in FIG. 5, the image erasing system further includes a locating unit 204;

the locating unit 204 is to determine a current coordinate position where the erasing operation behavior occurs on the image editing interface;

The displaying unit 203 is to display the screen clearing button at the coordinate position.

In one embodiment, the displaying unit 203 is further to terminate the displaying of the screen clearing button if the trigger command of the screen clearing button is not received within the preset time period.

In one embodiment, the displaying unit 203 is further to terminate the displaying of the screen clearing button if an operation command directed at positions other than the position where the screen clearing button is located in the image editing interface is received before the trigger command of the screen clearing button is received.

The image erasing system of the present invention one-to-one corresponds to the image erasing method of the present invention, and the technical features and advantageous effects of the embodiments of the image erasing method described above are all applicable to the embodiments of the image erasing system.

The technical features of the above-described embodiments may be combined in any way. For the sake of brevity of description, all possible combinations of the technical features in the above embodiments are not described. However, as long as there is no contradiction between the combinations of these technical features, all should be considered as the scope of the present description.

The above-mentioned embodiments are merely illustrative of several embodiments of the present invention, and the description thereof is more specific and detailed, but is not to be construed as limiting the scope of the invention. It should be noted that a number of variations and modifications may be made by those skilled in the art without departing from the spirit and scope of the present invention. Therefore, the scope of the present invention should be determined by the appended claims.

The invention claimed is:

1. An image erasing method, comprising:
performing a first mode of bit-by-bit erasing operation that erases a portion of an image editing interface;
acquiring an erasing operation parameter value corresponding to an erasing operation behavior associated with the bit-by-bit erasing operation;
determining, while performing the bit-by-bit erasing operation, whether the erasing operation parameter value exceeds a preset parameter threshold;
responsive to determining, while performing the bit-by-bit erasing operation, that the erasing operation parameter value exceeds the preset parameter threshold, displaying a screen clearing button on the image editing interface, wherein activation of the screen clearing button is to trigger a second mode of one-click erasing operation that clears the image editing interface; and
responsive to receiving a trigger command of the screen clearing button, clearing the image editing interface.

2. The image erasing method according to claim 1, wherein the erasing operation parameter value comprises a time duration value associated with the erasing operation behavior, and
wherein the determining whether the erasing operation parameter value exceeds the preset parameter threshold comprises determining whether the time duration value associated with the erasing operation behavior exceeds a preset duration threshold.

3. The image erasing method according to claim 1, wherein the erasing operation parameter value comprises one of a ratio of an erased area to a total area of the image or a number of erased objects to a total number of objects on the image, and
wherein the determining whether the erasing operation parameter value exceeds a preset parameter threshold comprises one of determining whether the ratio of the erased area to the total area of the image exceeds a preset first ratio threshold, or determining whether the ratio of the number of erased objects to the total number of objects of the image exceeds a preset second ratio threshold.

4. The image erasing method according to claim 1, wherein the erasing operation parameter value comprises a speed value of the erasing operation behavior, and
wherein the determining whether the erasing operation parameter value exceeds a preset parameter threshold comprises determining whether the speed value of the erasing operation behavior exceeds a preset speed threshold.

5. The image erasing method according to claim 1, wherein the erasing operation parameter value comprises a ratio of an erased area to a total area of the image, a time duration value associated with an erasing operation behavior, and a speed value of the erasing operation behavior, and
wherein the determining whether the erasing operation parameter value exceeds a preset parameter threshold comprises determining whether all or any two of the ratio of the erased area to the total area of the image, the time duration value associated with the erasing operation behavior, and the speed value of the erasing operation behavior exceed their corresponding preset thresholds;
or
wherein the erasing operation parameter value comprises a ratio of a number of erased objects to a total number of objects of the image, a time duration value associated with the erasing operation behavior, and a speed value of the erasing operation behavior, and
determining whether all or any two of the ratio of the number of erased objects to the total number of objects of the image, the time duration value associated with the erasing operation behavior, and the speed value of the erasing operation behavior exceed their corresponding preset thresholds.

6. The image erasing method according to claim 1, wherein the displaying the screen clearing button on the image editing interface comprises:
locating a current coordinate position of the erasing operation behavior on the image editing interface; and
displaying the screen clearing button at the current coordinate position.

7. The image erasing method according to claim 1, subsequent to the displaying the screen clearing button on the image editing interface, comprising:
terminating display of the screen clearing button if the trigger command of the screen clearing button is not received within a preset time period.

8. The image erasing method according to claim 1, subsequent to the displaying the screen clearing button on the image editing interface, comprising:
terminating display of the screen clearing button if an operation command operated at positions other than the position where the screen clearing button is located in the image editing interface is received before receiving the trigger command of the screen clearing button.

9. The image erasing method according to claim 1, wherein the first mode of erasing operation is directed to bit-by-bit erasing using an erasing tool, and the second mode of erasing operation is directed to one-click screen clearing by clicking a button.

10. An image erasing system, comprising:
a performing unit to perform a first mode of bit-by-bit erasing operation that erases a portion of an image editing interface;
an acquiring unit to acquire an erasing operation parameter value corresponding to an erasing operation behavior associated with the bit-by-bit erasing operation;

a determining unit to determine, while performing the bit-by-bit erasing operation, whether the erasing operation parameter value exceeds a preset parameter threshold; and a displaying unit to display a screen clearing button on the image editing interface when the determining unit determines, while performing the bit-by-bit erasing operation, that the erasing operation parameter value exceeds the preset parameter threshold, wherein activation of the screen clearing button is to trigger a second mode of erasing one-click operation that clears the image editing interface, and wherein the image editing interface is cleared when a trigger command of the screen clearing button is received.

11. The image erasing system according to claim 10, further comprising a locating unit to locate a current coordinate position of the erasing operation behavior on the image editing interface, wherein the displaying unit is configured to display the screen clearing button at the current coordinate position.

12. The image erasing system according to claim 10, wherein the erasing operation parameter value comprises one of a ratio of an erased area to a total area of the image or a number of erased objects to a total number of objects on the image, and wherein to determine whether the erasing operation parameter value exceeds a preset parameter threshold, the determining unit is further to one of determine whether the ratio of the erased area to the total area of the image exceeds a preset first ratio threshold, or determine whether the ratio of the number of erased objects to the total number of objects of the image exceeds a preset second ratio threshold.

13. The image erasing system according to claim 10, wherein the erasing operation parameter value comprises a speed value of the erasing operation behavior, and wherein to determine whether the erasing operation parameter value exceeds a preset parameter threshold, the determining unit is further to determining whether the speed value of the erasing operation behavior exceeds a preset speed threshold.

14. The image erasing system according to claim 10, wherein the erasing operation parameter value comprises a ratio of an erased area to a total area of the image, a time duration value associated with an erasing operation behavior, and a speed value of the erasing operation behavior, and
wherein to determine whether the erasing operation parameter value exceeds a preset parameter threshold, the determining unit is further to determine whether all or any two of the ratio of the erased area to the total area of the image, the time duration value associated with the erasing operation behavior, and the speed value of the erasing operation behavior exceed their corresponding preset thresholds;

or wherein the erasing operation parameter value comprises a ratio of a number of erased objects to a total number of objects of the image, a time duration value associated with the erasing operation behavior, and a speed value of the erasing operation behavior, and the determining unit is further to determine whether all or any two of the ratio of the number of erased objects to the total number of objects of the image, the time duration value associated with the erasing operation behavior, and the speed value of the erasing operation behavior exceed their corresponding preset thresholds.

15. The image erasing system according to claim 10, wherein to display the screen clearing button on the image editing interface, the displaying unit is to:

locate a current coordinate position of the erasing operation behavior on the image editing interface; and display the screen clearing button at the current coordinate position.

16. The image erasing system according to claim 10, wherein subsequent to the displaying the screen clearing button on the image editing interface, the displaying unit is to:

terminate display of the screen clearing button if the trigger command of the screen clearing button is not received within a preset time period.

17. The image erasing system according to claim 10, wherein subsequent to the displaying the screen clearing button on the image editing interface, the displaying unit is to:

terminate display of the screen clearing button if an operation command operated at positions other than the position where the screen clearing button is located in the image editing interface is received before receiving the trigger command of the screen clearing button.

18. The image erasing system according to claim 10, wherein the first mode of erasing operation is directed to bit-by-bit erasing using an erasing tool, and the second mode of erasing operation is directed to one-click screen clearing by clicking a button.

* * * * *